May 17, 1938.　　H. SMITH ET AL　　2,117,747
MILK DISPENSING DEVICE
Filed June 26, 1936　　3 Sheets-Sheet 1
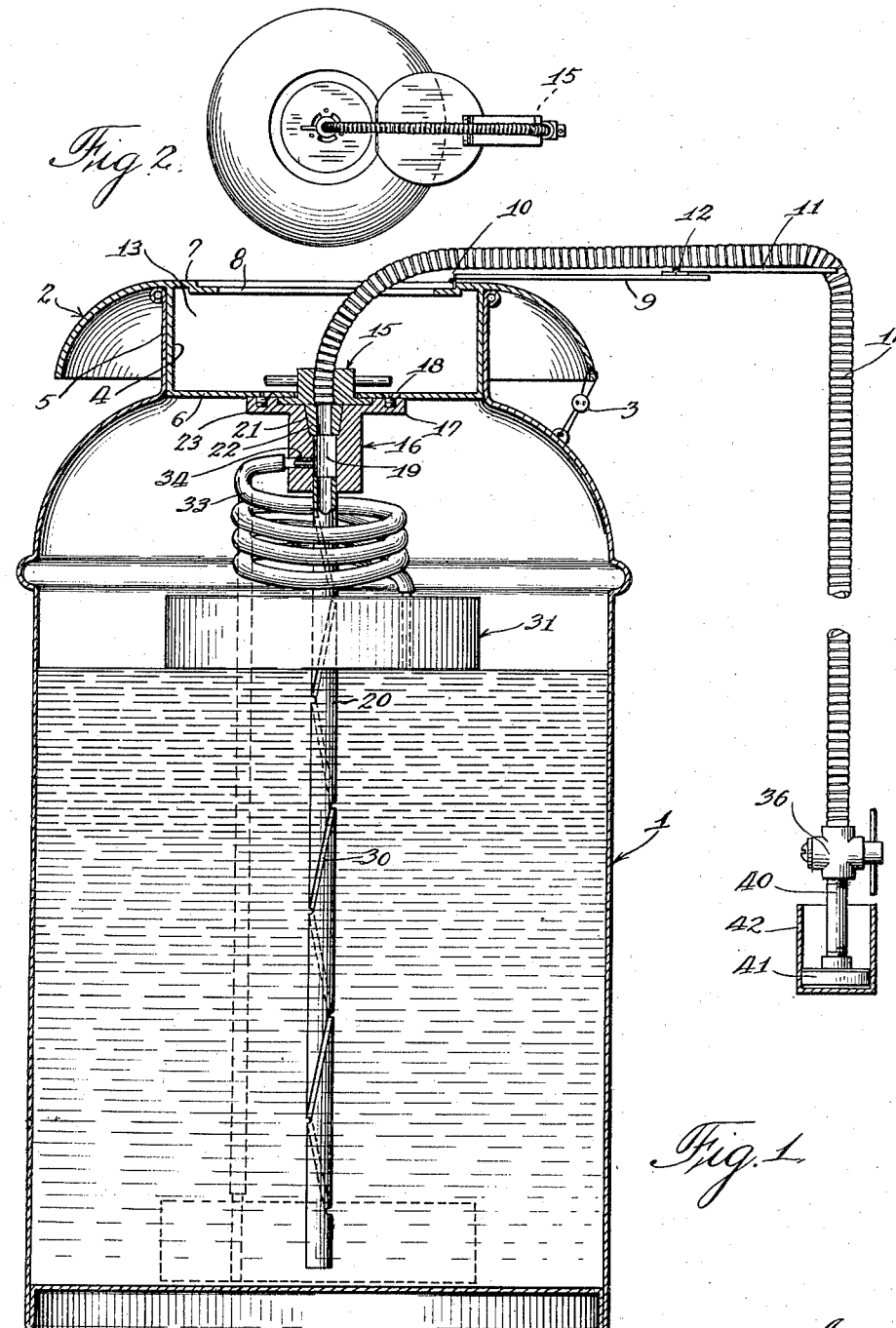

May 17, 1938.   H. SMITH ET AL   2,117,747
MILK DISPENSING DEVICE
Filed June 26, 1936   3 Sheets-Sheet 2
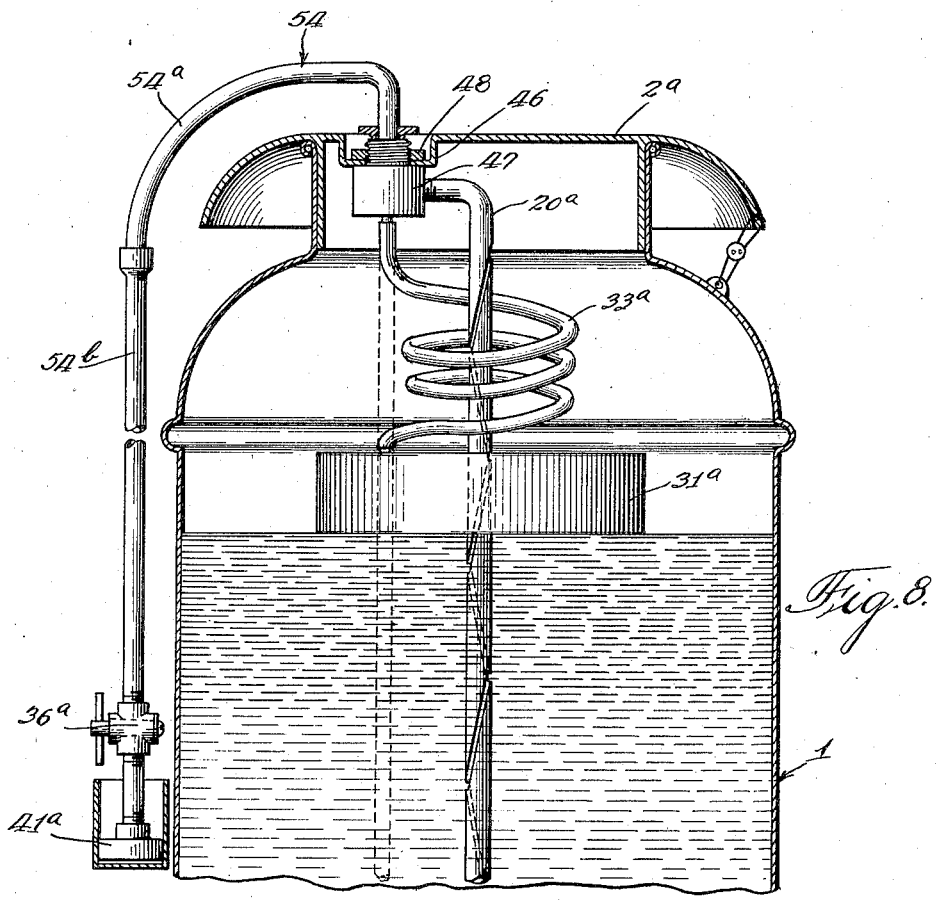
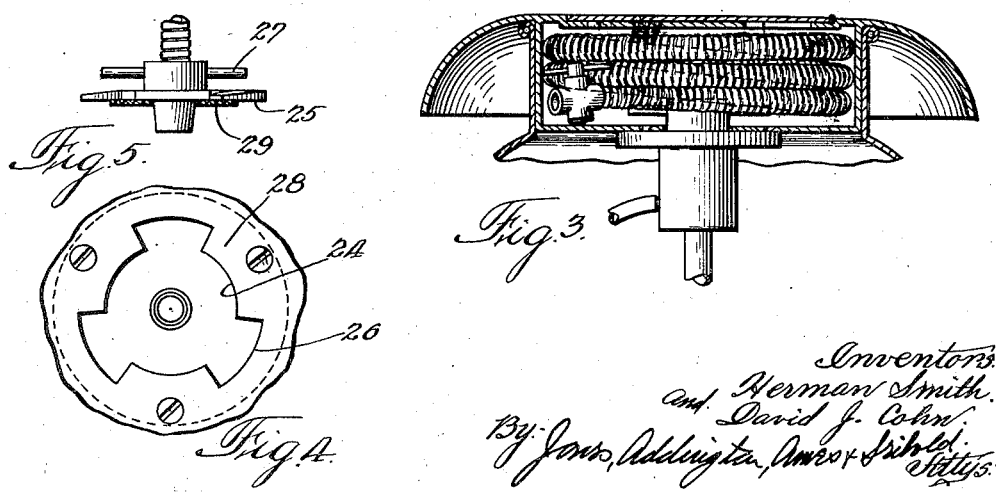

May 17, 1938. H. SMITH ET AL 2,117,747
MILK DISPENSING DEVICE
Filed June 26, 1936 3 Sheets-Sheet 3
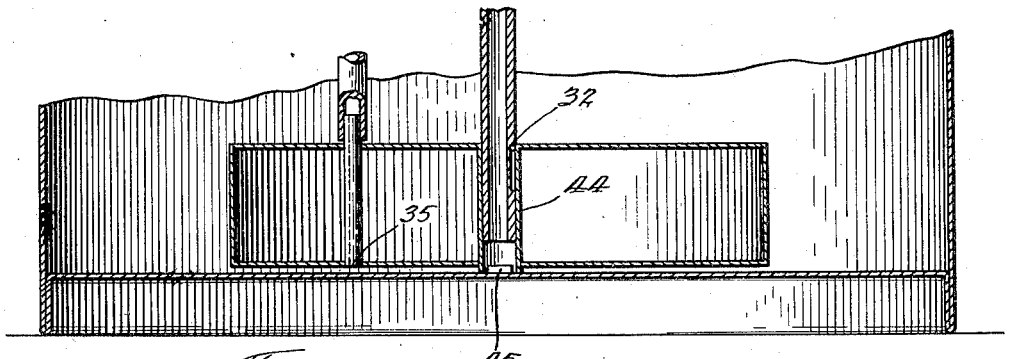
Fig. 6.
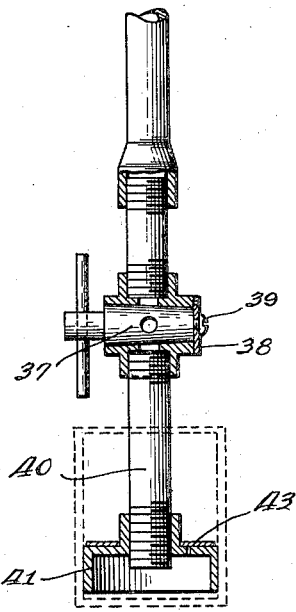
Fig. 7.
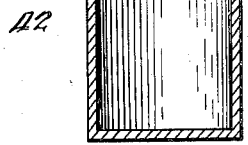
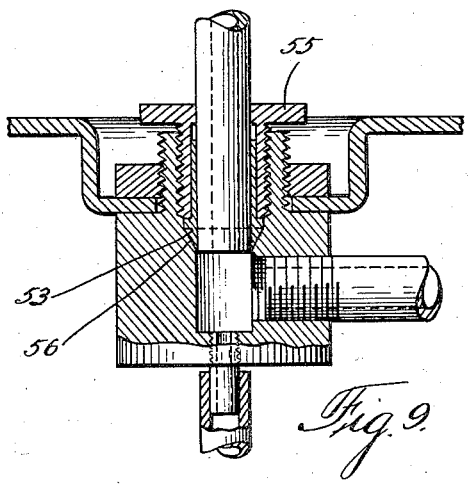
Fig. 9.
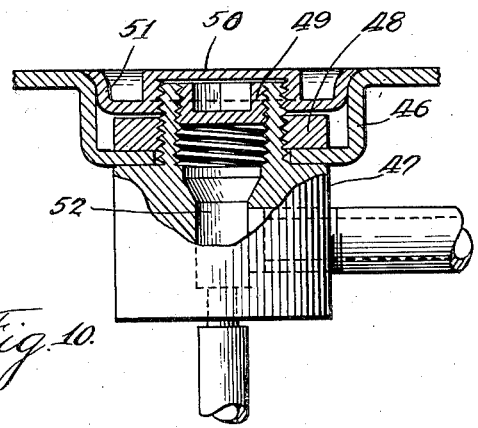
Fig. 10.
Inventors
Herman Smith
David J. Cohn
By Jones, Addington, Ames & Seibold
Attys.

Patented May 17, 1938

2,117,747

UNITED STATES PATENT OFFICE 2,117,747

MILK-DISPENSING DEVICE

Herman Smith and David J. Cohn, Chicago, Ill.

Application June 26, 1936, Serial No. 87,406

15 Claims. (Cl. 221—67)

This invention relates to a milk dispensing device, and more particularly to an improvement for use in connection with a container such as an ordinary milk can in which bulk milk is sold, whereby milk may be dispensed therefrom in small quantities and in which the milk dispensed will always contain a predetermined percentage of butter fat.

Milk as received in a bulk container divides itself into two layers. That is, the butter fat rises to the top and forms a layer of so-called cream. For the purposes of this application, the lower layer will be referred to herein as milk and the upper layer comprising a large percentage of butter fat will be referred to as cream.

In many localities the law requires that milk and cream be dispensed by retailers directly from the containers in which the product is received, and without affecting the sanitary condition of the milk. Such a law usually compels the retailer to dispense the entire amount of the product at one time from the container in which it is received for the reason that the effect of pasteurization is destroyed after the container is once opened. It has heretofore been practically impossible to dispense milk in small quantities from a bulk container and comply with the requirements.

It is an object of the present invention to provide a dispensing device for use in connection with the usual bulk container, by which any desired amount of milk having a predetermined percentage of cream therein, conforming with the requirements, may be dispensed therefrom.

Bulk milk received by the retailer is carefully pasteurized, and it is an object of the present invention to provide a device whereby any desired amount of milk and cream in a desired ratio and having a predetermined percentage of butter fat may be dispensed therefrom without opening the bulk container, and without disturbing the pasteurized condition of the product.

Another object is to provide a sanitary siphon for the usual milk can wherein at least all that portion of the siphon within the can may be removed with the cover and sterilized with the cover and can in the usual manner, and wherein any portion of the siphon outside the can may be easily attached thereto in operative relation without disturbing the sanitary condition of the milk.

It is also an object to provide a milk dispensing device which retains the container sealed at all times except when milk is actually being drawn therefrom, and in which, even at such times, the container is sealed by the milk being drawn therefrom.

A further object is to provide a cover for an ordinary milk container in which a complete dispensing device is associated therewith in such a manner that it may be completely enclosed within the contour of the usual container and cover.

Another object is the provision of a milk dispenser of few parts, easy to operate, which will not easily get out of order, and which may be easily cleaned and sterilized.

A further object is the provision of a simple and efficient siphon priming device which may be easily cleaned and maintained in a sanitary condition.

Further objects will be apparent from the specification and the appended claims.

In the drawings:

Figure 1 is a vertical sectional view through one embodiment of the invention.

Fig. 2 is a top view of the cover and siphon illustrated in Fig. 1.

Fig. 3 is a sectional view through the cover in its closed position and illustrates the method of packing the flexible siphon tube therein.

Fig. 4 is a top view of the coupling portion of the cover whereby the flexible siphon tube may be removably connected thereto.

Fig. 5 is a side view of the connector plug for connecting the flexible tube to the cover.

Fig. 6 is an enlarged sectional view through the bottom of the container and the ratio-controlling float.

Fig. 7 is a side elevation, partially in section, of the siphon priming device and the dispensing valve.

Fig. 8 is a vertical section through a slightly modified embodiment of the invention.

Fig. 9 is a fragmentary sectional view through the container cover and siphon connector illustrated in Fig. 8.

Fig. 10 is a sectional view similar to Fig. 9, but with the dispensing conduit disconnected and the opening sealed.

Referring to the drawings in detail, the embodiment illustrated in Figs. 1 to 7, inclusive, comprises the usual milk can or container 1, having a removable cover, preferably of the usual contour, and which may be sealed to the can after it is properly pasteurized, by means of the usual seal 3. It is desirable that the cover should be of substantially the same size as that ordinarily used and of the same outside contour, and that it should not have any projecting portion which might interfere with the ordinary storing and stacking of the containers, either before or after they are filled. The cover is therefore provided with a depressed cylindrical portion 4, arranged to snugly fit the neck 5 of the container and having a bottom wall 6, and a top wall 7 with an enlarged opening 8 therein. This opening 8 is normally closed by means of a door 9, hinged at 10, and provided with a hinged extension 11, hinged at 12 to the cover 9. The extension 11 is for a purpose which will be later described, and when the door is closed as shown in Fig. 3, the extension 11 is folded inwardly, closely adjacent the hinged door 9, which then snugly closes the opening 8. Any suitable means such as a spring catch, not shown, may be provided to retain the door closed, and a depressed handle may be provided, whereby it may be easily opened.

The cover structure provides a chamber 13 for enclosing a flexible tube 14, which comprises part of a siphon for dispensing the milk in a manner which will be described later. The hinged extension 11 is provided with a notch 15 at its outer end, as shown in Fig. 2, for the purpose of engaging and supporting the flexible tube 14 and retaining it in the position shown in Fig. 1. The flexible tube 14 is preferably made of a single piece of aluminum which may be readily sterilized, and is provided at its inner end with a coupling member 15, which latter is secured thereto, and may be snugly attached to the can cover by rotary movement, to form a leak-proof connection as illustrated in Fig. 1. A coupling block 16 is provided with an outwardly extending flange 17 and secured to the bottom wall 6 of the cover 2, by means of screws 18, or may be secured in any other suitable manner whereby leakage is prevented. The coupling block 16 is provided with an axial passage 19 extending therethrough and communicating with a downwardly extending tube or conduit 20, mounted in the block 16. This tube 20 terminates closely adjacent the bottom of the container 1, and is arranged to provide a part of the siphon for dispensing the contents of the can. The upper end of the passage 19 in the coupling block 16 forms a tapered opening as indicated at 21, and this opening is arranged to receive a downwardly extending correspondingly tapered portion 22 on the coupling member 15, when it is inserted therein.

The coupling member 16 is provided with a depression 23 in its upper surface below the bottom wall 6 of the cover and the wall 6 is provided with an opening 24 arranged to receive the coupling member 15 of the flexible tube 14. The coupling member 15 is provided with a plurality of radially disposed cam arms 25, which are arranged to be inserted in correspondingly radially disposed openings 26 (Fig. 4) in the bottom wall 6 of the cover, and when the coupling member 15 is partially rotated by means of a handle 27, the cam members 25 are wedged underneath the overhanging portions 28 of the bottom wall 6, and the corresponding tapered portions 21 and 22 of the coupling members 15 and 16 will be snugly engaged in a manner to seal the connection and prevent leakage therethrough, and to permit dispensing of milk through the siphon. A resilient washer 29 (Fig. 5) may be mounted on the connector portion 15.

By means of the structure just described, it will be apparent that a complete siphon is provided from the bottom of the can through the tube 20, the connector members 15 and 16, and the tube 14, and the flexible tube 14 is removably attached to that portion of the siphon within the can by means of the coupling members.

The tube 20 is preferably axially positioned relative to the cover and container as illustrated in Fig. 1, and may be provided with a spiral groove 30 as illustrated. A float 31 is slidably mounted on the tube or conduit, and provided with an inwardly extending lug 32 (Fig. 6) which extends into the groove 31 and causes the float to rotate around the tube as it moves downwardly when the contents of the container are withdrawn therefrom. A flexible conduit 33 is connected at one end to the coupling member 16, and communicates with the passage 19 through a suitable restricted passage 34. The opposite end of the float 31 comprising the inlet to this conduit extends through the float 31, and is positioned adjacent the bottom of the float as indicated by the reference character 35 (Fig. 6). The flexible conduit 34 may be of rubber or other suitable material and is preferably of such length that when the float is at the bottom of the can the conduit is substantially vertical as indicated by the dotted lines (Fig. 1), and when the float is raised as shown in full lines, the spiral groove and associated lug will cause the float to rotate around the axial conduit 20 and wind the flexible conduit spirally around the conduit 20.

The removable flexible conduit 14 is provided with a dispensing valve 36, which may be of the type illustrated and comprises an ordinary tapered valve portion 37 retained in position by means of a washer 38, and securing the screw 39. This construction enables the easy removal of the tapered valve portion so that the entire valve may be conveniently sterilized. The conduit 14 is of a sufficient length, so that in use the valve 36 is supported below the bottom of the container 1. Therefore, the associated conduits provide a device which may be operated in the manner of the ordinary siphon.

The chamber 13 in the cover provides a container into which the flexible conduit 14 may be coiled and stored as illustrated in Fig. 3, when the container is filled for shipment or storage. When it is desired to dispense milk from the container, the hinged door 9 in the container cover, together with the hinged extension 11, is opened and the conduit 14 is extended from the cover as illustrated in Fig. 1 and supported on the extension. The siphon may, of course, be primed when the container is filled, and if this is done it is only necessary for the distributor to open the valve 36 when it is properly positioned below the container and any desired amount of milk having a predetermined percentage of butter fat therein may be withdrawn from the container.

In some cases it is preferable not to prime the siphon before shipment, and therefore a priming device is provided which may be removably attached to the dispensing valve by the operator in the manner illustrated. This priming device comprises a conduit extension 40 which may be screwed into or otherwise attached to the dispensing valve 36. The extension 40 is provided with a piston head 41, and a cylindrical cup 42 is arranged to snugly fit the piston. When it is desired to dispense the contents of the container, the cup 42 is pushed upwardly over the piston 41, the air from the cup escaping through a small opening 43 in the piston (Fig. 7). After the cup 42 is positioned over the piston as indicated in dotted lines in Fig. 7, the valve 36 is open and the cup is quickly pulled downwardly, thereby filling or priming the conduit 14 with milk and cream from the container. The valve 36 is then closed and the cup 42 removed, and thereafter the contents of the container may be siphoned therefrom into any suitable receptacle placed under the end of the conduit 14 when the valve 36 is opened. It will be understood that the priming device is not essential, as it is entirely feasible to prime the siphon before the container is delivered to the milk distributor.

The piston 41 is preferably in the form of an inverted cup, and the siphon extension 40 extends somewhat into the piston and below the surface thereof, whereby an ordinary drinking glass may be inserted into the piston and over the end of the extension. This extension into the piston prevents the milk from spreading outwardly and tends to keep the discharge end clean and sanitary.

Milk furnished by a dairy is required to conform with certain laws and ordinances as to the relative percentage of butter fat, or so-called cream therein. In the present embodiment, therefore, the size of the inlets of the axial conduit 20 within the container, and the flexible conduit 33 within the container are relative to the predetermined ratio of the amount of cream and milk to be dispensed from the container to provide the predetermined butter fat content. It will therefore be apparent that as the contents are withdrawn from the container, the float 31 will be gradually lowered to the bottom, as indicated by dotted lines in Fig. 1, and a correct relative amount of cream and milk will be dispensed therefrom at all times.

In order that substantially all of the contents may be dispensed from the container, the float 31 is provided with an axial sleeve 44 (Fig. 6) which extends somewhat below the end of the conduit 20 when the float is in its lowered position. The lower end of this sleeve is notched or cut away as illustrated at 45, to permit the passage of milk therethrough and into the conduit 20. By this means, substantially all of the contents of the container may be withdrawn in the correct relative proportions.

Figs. 8, 9, and 10 illustrate a slightly modified embodiment, in which the outer portion of the siphon is preferably in the form of a rigid conduit which may be removably attached to the cover of the container after the container has been received by the dispenser. This embodiment comprises the usual container 1, having a cover 2a of the ordinary type with the exception that it is provided with a depressed portion 46 having a threaded coupling member 47 mounted therein, and secured in position by means of a nut 48.

The coupling member 47 is a so-called three-way connector, and is internally threaded and closed by means of a threaded plug 49 (Fig. 10). A cap 50 is threaded onto the coupling member 47 as illustrated, and is preferably provided with an outwardly extending flange 51, which prevents dirt and dust from entering into the depressed portion 26, and retains it in a sanitary condition until received by the dealer. A conduit 20a is connected to the coupling member 47 and corresponds to the conduit 20 previously described. The conduit 20a is preferably vertically positioned, substantially on the axial line of the can 1. This conduit 20a may be provided with a spiral groove and arranged to guide the float 31a in the same manner as previously described. In this construction, the flexible conduit 33a is connected to the coupling member 47 and communicates with the siphon passage 52 therethrough, as illustrated in Figs. 9 and 10.

When a container having the milk therein is received by the retailer, the parts are as illustrated in Fig. 8 with the exception that the dispensing portion of the siphon is not connected to the cover and the outlet opening of the coupling member 47 is closed by the plug and dust cap as illustrated in Fig. 10.

When it is desired to dispense milk and cream in the proper proportions from the container, the dust cap 50 and the plug 49 are removed from the cover and the tapered end 53 of a dispensing conduit 54 is inserted in the coupling 47 and secured therein by means of a threaded bushing 55 (Fig. 9), the tapered end 53 cooperating with a correspondingly tapered portion 56 of the coupling to provide a leak-proof joint. The dispensing conduit 54 extends outwardly and downwardly as illustrated in Fig. 8 and its lower end is provided with a dispensing valve 36a, and a priming piston 41a, which may be of the same construction and operate in the same manner for priming as the structure previously described.

For convenience in sterilizing and storing, the conduit 54 may be built up of comparatively short sections such as 54a and 54b, which may be easily connected and separated. For convenience in illustration, the conduit 54 is shown broken, and the discharge end is shown above the bottom of the container. However, it is understood that in practice this conduit extends below the bottom of the container in order that all of the contents therein may be siphoned therefrom.

It is desirable that a stop be provided to retain the float 31 on the tube 30 when the cover is removed from the can. In the present embodiment the stop is provided by the lug 32 engaging the end of the spiral groove 30. However, it will be apparent that any suitable stop may be provided.

The spiral movement of the float is advantageous. However, it is not essential and the spiral groove or equivalent means for obtaining the rotary movement may be dispensed with and the device will operate satisfactorily.

Modifications may be made without departing from the spirit of the invention. It is therefore desired that the invention be limited only by the appended claims and the scope of the prior art.

Having thus described this invention, what is claimed and desired to be secured by Letters Patent is:

1. A sanitary milk dispenser comprising an open top container, a cover for said container, a siphon supported by and removable with said cover, and arranged to dispense the contents of said container in desired amounts, and means associated with said siphon to cause said siphon simultaneously to withdraw a predetermined ratio of milk and cream from said container.

2. A sanitary milk dispenser comprising an open top container, a cover for said container, a siphon supported by and removable with said cover, and arranged to dispense the contents of said container in desired amounts, and in a single stream, and means for directing a predetermined flow of cream into said stream, whereby the dispensed stream comprises a predetermined constant ratio of milk and cream having a predetermined percentage of butter fat.

3. A sanitary milk dispenser comprising an open top container, a cover for said container, a siphon supported by and removable with said cover, and arranged to dispense the contents of said container in desired amounts, means associated with said siphon to cause said siphon simultaneously to withdraw a predetermined ratio of milk and cream from said container, and a removable valve for closing the discharge end of said siphon.

4. A sanitary milk dispenser comprising an open top container, a cover for said container, and a siphon arranged to dispense all of the contents in desired amounts, said siphon being supported by and removable with said cover and having means associated therewith to cause said siphon to withdraw all of the contents of said container in a stream comprising a predetermined constant ratio of milk and butter fat, a removable valve for closing the discharge end of said siphon, and means below said valve for priming said siphon.

5. A milk dispenser comprising a container, a dispensing siphon, said siphon being constructed and arranged to withdraw all of the contents of said container in a stream comprising a predetermined constant ratio of milk and cream having a predetermined percentage of butter fat, a removable valve for closing the discharge end of said siphon, and means below said valve for priming said siphon, said means comprising a piston attached to the outlet and a cylindrical member movable over said piston to draw fluid from said container to completely fill said siphon.

6. A milk dispenser comprising a container, a siphon constructed and arranged to withdraw desired amounts of fluid therefrom, said siphon comprising a conduit arranged to withdraw fluid from below the cream line, and an automatically adjustable conduit arranged to withdraw fluid from above the cream line, said conduits being arranged to simultaneously withdraw predetermined proportions of milk and cream, and a single dispensing conduit to receive and discharge said milk and cream.

7. A milk dispenser comprising a container, a siphon constructed and arranged to withdraw desired amounts of fluid therefrom, said siphon comprising a conduit arranged to withdraw fluid from below the cream line, and an automatically adjustable conduit arranged to withdraw fluid from above the cream line, said conduits being arranged to simultaneously withdraw predetermined proportions of milk and cream, a single dispensing conduit to receive and discharge said milk and cream, and means for priming said last conduit to start said flow.

8. A milk dispenser comprising a container, a siphon constructed and arranged to withdraw desired amounts of fluid therefrom, said siphon comprising a conduit arranged to withdraw fluid from below the cream line, an automatically adjustable conduit arranged to withdraw fluid from above the cream line, said conduits being arranged to simultaneously withdraw predetermined proportions of milk and cream, a single dispensing conduit to receive and discharge said milk and cream, and means for priming said last conduit to start the flow through said siphon, and a valve for controlling said flow after the conduit is primed.

9. In a milk dispensing device comprising a container having a cover, the combination with a siphon conduit extending through said cover and communicating with the bottom of said container, of a float on the surface of the liquid in said container, and a flexible conduit communicating with the liquid above the cream line and with said siphon above the liquid line.

10. In a milk dispensing device comprising a container having a cover, the combination with a siphon conduit extending through said cover and communicating with the bottom of said container, of a float on the surface of the liquid in said container, and a flexible conduit communicating with the liquid above the cream line and with said siphon above the liquid line, the passage in said flexible conduit communicating with the fluid through the bottom surface of said float.

11. In a milk dispensing device comprising a container having a cover, the combination with a siphon conduit extending through said cover and communicating with the bottom of said container, of a float on the surface of the liquid in said container, a flexible conduit communicating with the liquid above the cream line and with said siphon above the liquid line, said flexible conduit having one end supported by said float and being normally wound around said siphon conduit when said container is filled, and means to move said float to unwind said flexible conduit as the fluid is withdrawn.

12. A milk dispensing device comprising a container, a removable cover for said container, a conduit supported by said cover and terminating adjacent the bottom of said container, a flexible conduit removably connectible with said first conduit to form a siphon therewith, said first conduit being arranged to discharge a predetermined flow amount of fluid from the bottom of said container, a second conduit communicating with said siphon, means to maintain the inlet of said second conduit at all times in siphoning relation to the top of the fluid, the capacity of said conduits being related to cause a predetermined percentage flow of top and bottom fluid to be discharged from said siphon.

13. A milk container siphon comprising a cover having a chamber therein, a conduit extending from said chamber and into the fluid in said container, a flexible conduit normally stored in said chamber and extensible therefrom to an extension of said first conduit and having a dispensing valve, and a door substantially flush with the top of said cover for closing said chamber and arranged to support said flexible conduit in siphoning position when open.

14. A milk container siphon comprising a cover having a chamber therein, a conduit extending from said chamber and into the fluid in said container, a flexible conduit outside said container and forming an extension of said conduit and having a dispensing valve, said flexible conduit being normally stored within said chamber and extensible therefrom, a door substantially flush with the top of said cover for closing said chamber and arranged to support said flexible conduit in siphoning position when open, and extensible means for supporting said flexible conduit beyond the limit of said door.

15. A milk dispenser comprising an ordinary commercial milk can having the usual cover therefor, said cover having a depression in the top, a three-way conduit coupling sealed in said depression and extending inside said cover, a removable plug in the outlet of said coupling, a conduit connected with said coupling and communicating with the bottom of said container, a second conduit communicating with the top of the fluid in said container and with said coupling and arranged to maintain contact with the surface of the fluid as it is withdrawn from the container, a removable dust cap closing said depression, and a siphon dispensing conduit connectible with said coupling when said dust cap and said plug are removed.

HERMAN SMITH.
DAVID J. COHN.